US010660304B2

(12) United States Patent
Huang et al.

(10) Patent No.: US 10,660,304 B2
(45) Date of Patent: May 26, 2020

(54) PET FEEDING DEVICE

(71) Applicant: Acer Incorporated, New Taipei (TW)

(72) Inventors: Yu-Cheng Huang, New Taipei (TW);
Shao-Chi Chuang, New Taipei (TW);
Tsung-Hsun Wu, New Taipei (TW);
Yao-Kai Chuang, New Taipei (TW);
Wei-Chen Lai, New Taipei (TW)

(73) Assignee: Acer Incorporated, New Taipei (TW)

( * ) Notice: Subject to any disclaimer, the term of this patent is extended or adjusted under 35 U.S.C. 154(b) by 196 days.

(21) Appl. No.: 15/721,964

(22) Filed: Oct. 2, 2017

(65) Prior Publication Data
US 2018/0199541 A1 Jul. 19, 2018

(30) Foreign Application Priority Data

Jan. 19, 2017 (TW) .............................. 106101801 A

(51) Int. Cl.
*A01K 5/02* (2006.01)
*A01K 5/01* (2006.01)
(52) U.S. Cl.
CPC .......... *A01K 5/0114* (2013.01); *A01K 5/0291* (2013.01)
(58) Field of Classification Search
CPC ...... A01K 5/0114; A01K 5/0142; A01K 5/02; A01K 5/0225; A01K 5/025; A01K 5/0275

(Continued)

(56) References Cited

U.S. PATENT DOCUMENTS 2,969,769 A * 1/1961 Paschall ............... A01K 5/0275
119/56.1
3,505,977 A * 4/1970 Mancini ............... A01K 5/0114
119/61.51

(Continued)

FOREIGN PATENT DOCUMENTS

CA 2754930 A1 * 5/2012 ........... A01N 1/0226
CN 2698068 5/2005

(Continued)

OTHER PUBLICATIONS

WOPET Figure 1, WOPET F01 7L Timer Programmable Automatic Pet Feeder (https://www.wopet.com/collections/auto-feeder/products/wopet-7l-timer-programmable-feeder#shopify-product-reviews) (Year: 2016).*

(Continued)

*Primary Examiner* — Monica L Williams
*Assistant Examiner* — Michael A. Fabula
(74) *Attorney, Agent, or Firm* — JCIPRNET

(57) ABSTRACT

The invention is a pet feeding device provides a feeding mechanism on a basis of fixed time and fixed amount of food for a pet. The pet feeding device includes a base and a rotatable tray. The base has a first opening and a second opening communicated with each other, and the second opening connects the base and an exterior environment. The rotatable tray having third openings is assembled to the base and rotates about an axis. The feed pellets received in the pet feeding device fall into the third openings with a rotation of the rotatable tray. In a process of rotation, the first opening covers portion of the third openings correspondingly in a unit time, and the feed pellets in the corresponding third openings drop out of the pet feeding device via the first opening and the second opening.

7 Claims, 7 Drawing Sheets

(58) Field of Classification Search
USPC ......... 119/51.02, 51.12, 52.4, 53, 56.1, 56.2, 119/57, 57.1, 57.2, 57.5, 57.92, 59
See application file for complete search history.

(56) References Cited

U.S. PATENT DOCUMENTS

| | | | | |
|---|---|---|---|---|
| 3,894,657 | A * | 7/1975 | Eckmayr | A63B 47/002 221/265 |
| 3,955,537 | A * | 5/1976 | Yujiri | A01K 5/0275 119/51.13 |
| 4,534,492 | A * | 8/1985 | Schwarzli | G07F 11/44 221/203 |
| 4,770,125 | A * | 9/1988 | Gold | A01K 5/0114 119/53.5 |
| 4,823,738 | A * | 4/1989 | Gold | A01K 5/0114 119/51.01 |
| 5,549,217 | A * | 8/1996 | Benarrouch | B65D 83/0409 221/155 |
| 5,794,816 | A * | 8/1998 | Pliler | G07F 11/44 221/203 |
| 5,901,886 | A * | 5/1999 | Grindstaff | A01K 5/0275 222/156 |
| 6,845,735 | B1 * | 1/2005 | Northrop | A01K 5/0225 119/52.1 |
| 7,426,901 | B2 | 9/2008 | Turner et al. | |
| 7,743,942 | B1 * | 6/2010 | Chang | G07F 11/44 194/232 |
| 8,066,206 | B1 * | 11/2011 | Cotham | A01C 7/02 239/653 |
| 8,347,817 | B1 * | 1/2013 | Miller | A01K 5/0291 119/54 |
| 9,384,621 | B1 * | 7/2016 | Chang | G07F 13/10 |
| 10,478,276 | B2 * | 11/2019 | Kreiger | B65D 83/0409 |
| 2005/0066905 | A1 * | 3/2005 | Morosin | A01K 5/0291 119/51.02 |
| 2006/0185606 | A1 * | 8/2006 | Park | A01K 5/0114 119/51.12 |
| 2009/0120369 | A1 * | 5/2009 | Lewis | A01K 5/0225 119/51.01 |
| 2009/0173282 | A1 * | 7/2009 | Wu | A01K 5/0114 119/51.02 |
| 2009/0205573 | A1 * | 8/2009 | Briere | A01K 5/02 119/57.91 |
| 2010/0095895 | A1 * | 4/2010 | Laliberta | A01K 5/0275 119/56.1 |
| 2010/0269757 | A1 * | 10/2010 | Park | A01K 5/0114 119/54 |
| 2013/0047927 | A1 * | 2/2013 | Chang | A01K 5/0225 119/57.92 |
| 2016/0295836 | A1 * | 10/2016 | Cheng | A01K 5/02 |
| 2016/0324117 | A1 * | 11/2016 | Christie | A01K 5/0225 |
| 2017/0238503 | A1 * | 8/2017 | Deritis | A01K 5/0275 |
| 2019/0046311 | A1 * | 2/2019 | Kreiger | B65D 83/0409 |

FOREIGN PATENT DOCUMENTS

| | | | | |
|---|---|---|---|---|
| CN | 204070095 | | 1/2015 | |
| DE | 102014107621 A1 * | | 12/2015 | ........... A01K 5/0275 |
| FR | 1166727 A * | | 11/1958 | ........... A01K 5/0275 |
| GB | 138202 A * | | 2/1920 | ............. G07K 11/44 |
| TW | M278229 | | 10/2005 | |
| TW | M370935 | | 12/2009 | |
| TW | M427784 | | 5/2012 | |
| TW | M479015 | | 6/2014 | |
| TW | M502334 | | 6/2015 | |
| TW | M505808 | | 8/2015 | |

OTHER PUBLICATIONS

WOPET Figure 2, WOPET F01 7L Timer Programmable Automatic Pet Feeder showing stirring sheets (https://www.wopet.com/blogs/pets-knowledge/automatic-feeding-way-allows-cats-to-trust-you-more) (Year: 2016).*
WOPET Figure 3, Customer Review of WOPET F01 7L Timer Programmable Automatic Pet Feeder (Year: 2016).*

* cited by examiner

PET FEEDING DEVICE

CROSS-REFERENCE TO RELATED APPLICATION

This application claims the priority benefit of Taiwan application serial no. 106101801, filed on Jan. 19, 2017. The entirety of the above-mentioned patent application is hereby incorporated by reference herein and made a part of this specification.

BACKGROUND

Technical Field

The invention is related to a pet feeding device.

Description of Related Art

As the number of people keeping pets such as cats, dogs and pet mice increases, the products for pets have also be developed with more varieties. Generally speaking, such products are designed for pets to use easily and also convenient for pet owners to clean or change. Common products of this kind include pet houses, beds, feeders, water feeders and the like.

Take pet feeders as an example, existing feeders are containers in a bowl-like or tray-like shape with space for receiving feed pellets and food so that the pet owner can put food in the feeder. However, when cats and dogs eat the food, they usually eat in the way of pushing the food with their mouth and nose to send the food into their mouth. When the food becomes less, since the cats and dogs are only capable of eating in the manner described above, the food is often pushed aside to the edge of the container. In that case, the cats and dogs are not able to eat the rest of the food. Meanwhile, the food is easily scattered out of the container. Moreover, such container does not serve the function of controlling the amount of food to be fed to the pets. In particular, when the pet is sick and needs to take medicine, it is inconvenient to reply on the pet owner to control the amount of medicine.

SUMMARY

The invention provides a pet feeding device which provides a feeding mechanism on a basis of fixed time and fixed amount of food.

In the invention, the pet feeding device receives a plurality of feed pellets for the pet. The pet feeding device includes a base and a rotating tray. The base has a first opening and a second opening communicated with each other, and the second opening connects the base and an exterior environment. The rotating tray having a plurality of third openings is assembled to the base and rotates about an axis. The feed pellets received in the pet feeding device fall into the third openings respectively with a rotation of the rotating tray. In a process of rotation, the first opening covers portion of the third openings correspondingly in a unit time, and the feed pellets in the corresponding third openings drop out of the pet feeding device for the pet via the first opening and the second opening.

Based on the above, the pet feeding device receives a plurality of feed pellets via the plurality of third openings of the rotating tray. When the rotating tray rotates, the first opening in the base correspondingly covers portion of the third openings in a unit time so that the feed pellets in the corresponding third openings drop out of the pet feeding device for the pet via the first and second openings. By controlling the corresponding relationship between the third opening of the rotating tray and the first opening in the base, the number of feed pellets dropped out in a unit time is fixed so the amount of food for the pet can be controlled effectively.

In order to make the aforementioned features and advantages of the invention more comprehensible, embodiments accompanying figures are described in detail below.

DESCRIPTION OF EMBODIMENTS

Figure 1:
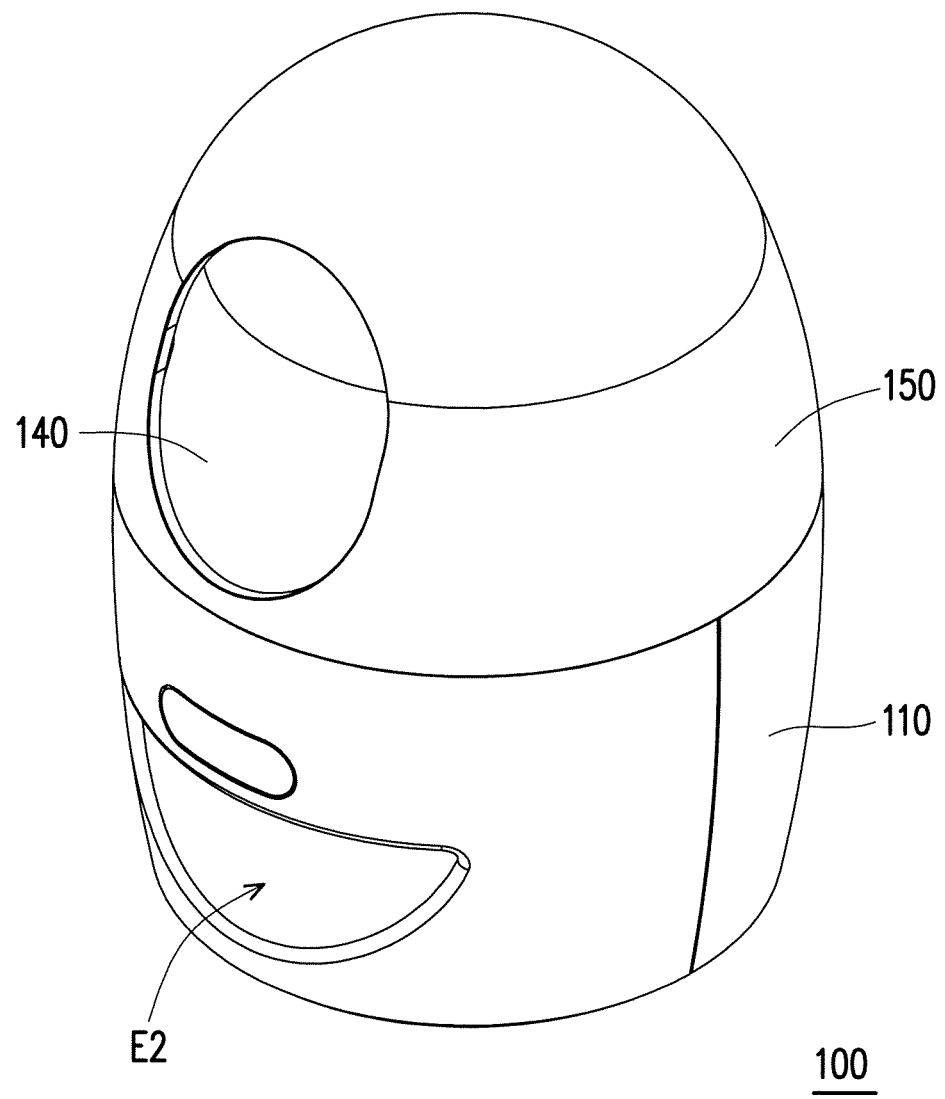
FIG. 1 is a schematic view of a pet feeding device according to one embodiment of the invention.
Figure 2:
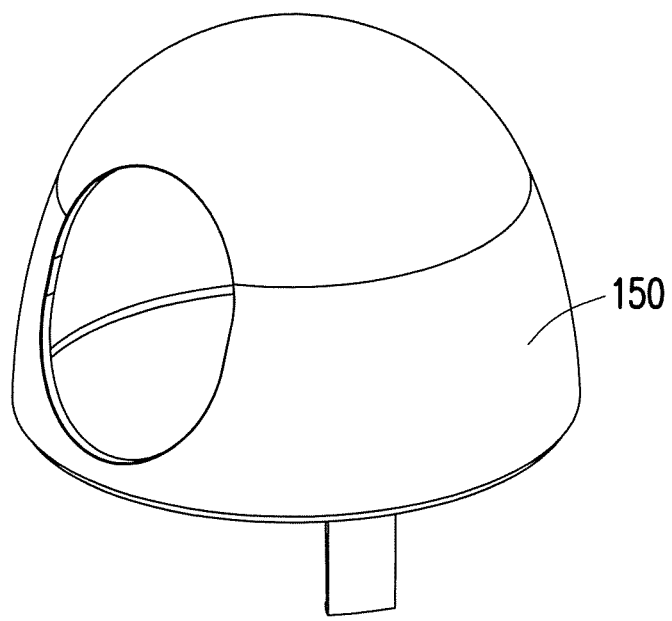
FIG. 2 is a schematic view of a portion of components of the pet feeding device in FIG. 1.
Figure 2:
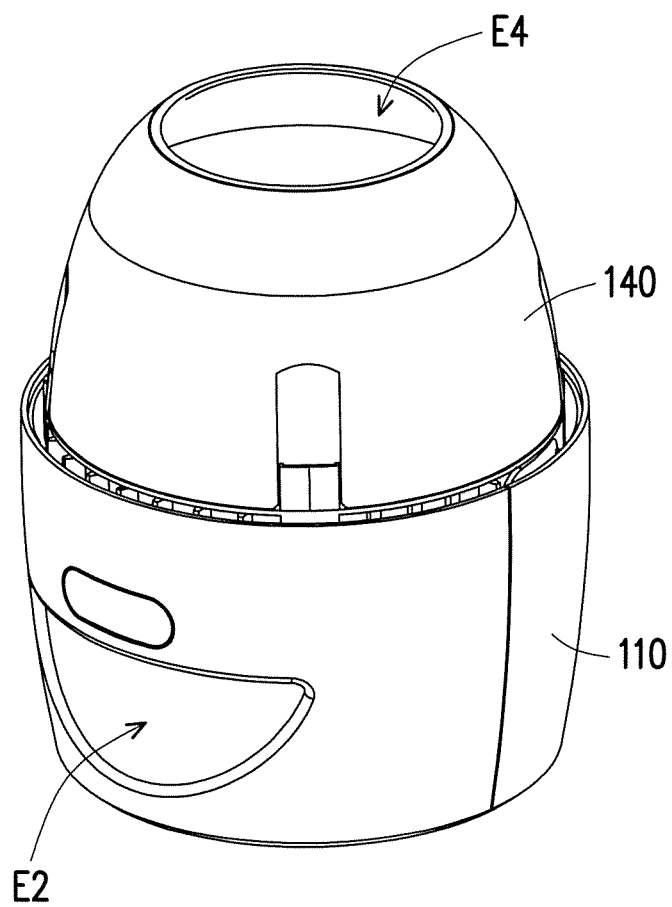
Figure 3:
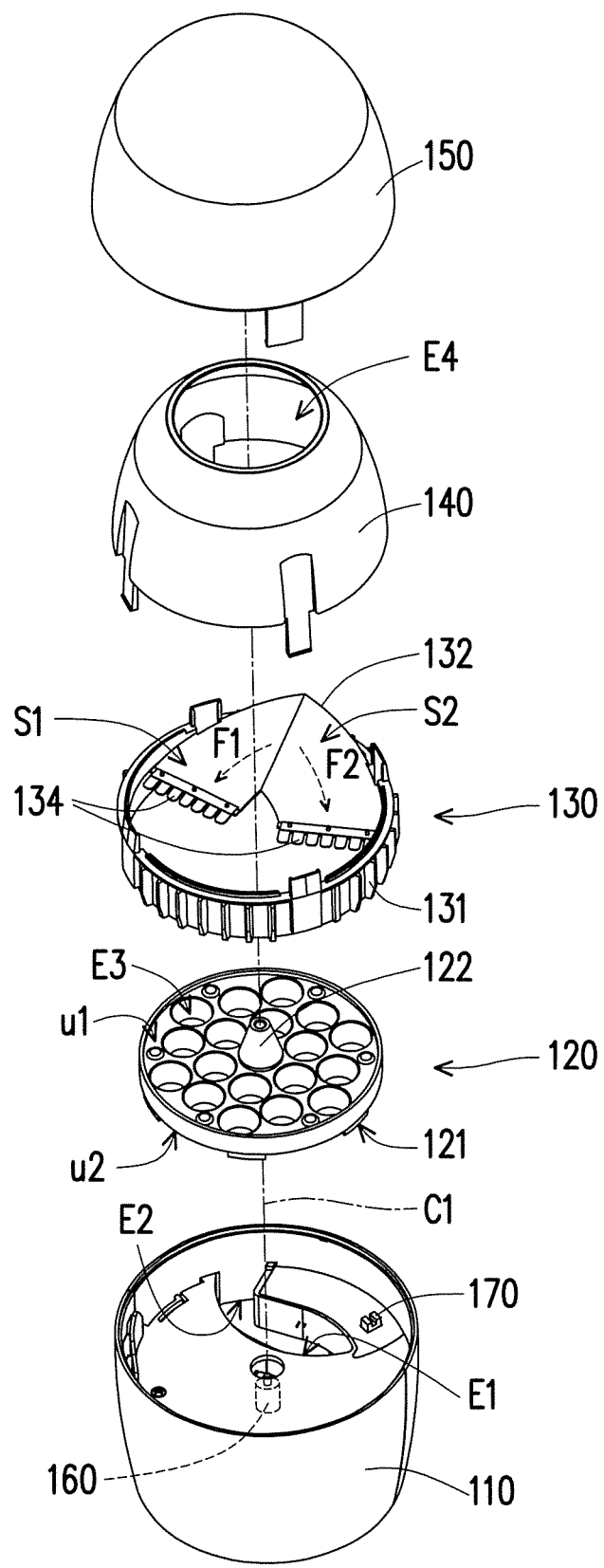
FIG. 3 is an explosive view of the pet feeding device in FIG. 1.

FIG. 1 is a schematic view of a pet feeding device according to one embodiment of the invention. FIG. 2 is a schematic view of a portion of components of the pet feeding device in FIG. 1. FIG. 3 is an explosive view of the pet feeding device in FIG. 1. Referring to FIGS. 1 to 3 at the same time, in the embodiment, a pet feeding device 100 includes a base 110, a rotating tray 120, a stirring assembly 130, a first cover 140 and a second cover 150, wherein the base 110 has a first opening E1 and a second opening E2 communicated with each other. The second opening E2 connects an inside of the base 110 and an exterior environment. The rotating tray 120 and the stirring assembly 130 are assembled on the base 110. The first cover 140 is assembled on the base 110 and covers the rotating tray 120 and the stirring assembly 130. The second cover 150 is assembled on and covers the first cover 140 so as to form a closed space with the base 110. Here, the rotating tray 120 has a plurality of third openings E3, and the first cover 140 has a fourth opening E4. The feed pellets can be put into the pet feeding device 100 via the fourth opening E4, and further fall into the third opening E3 with rotation of the rotating tray 120 rotating about an axis C1 so as to drop out of the pet feeding device 100 for the pet via the first opening E1 and second opening E2 correspondingly. The invention provides no limitation to the type of pet feed, and is also applicable for pet pills.

Figure 4:
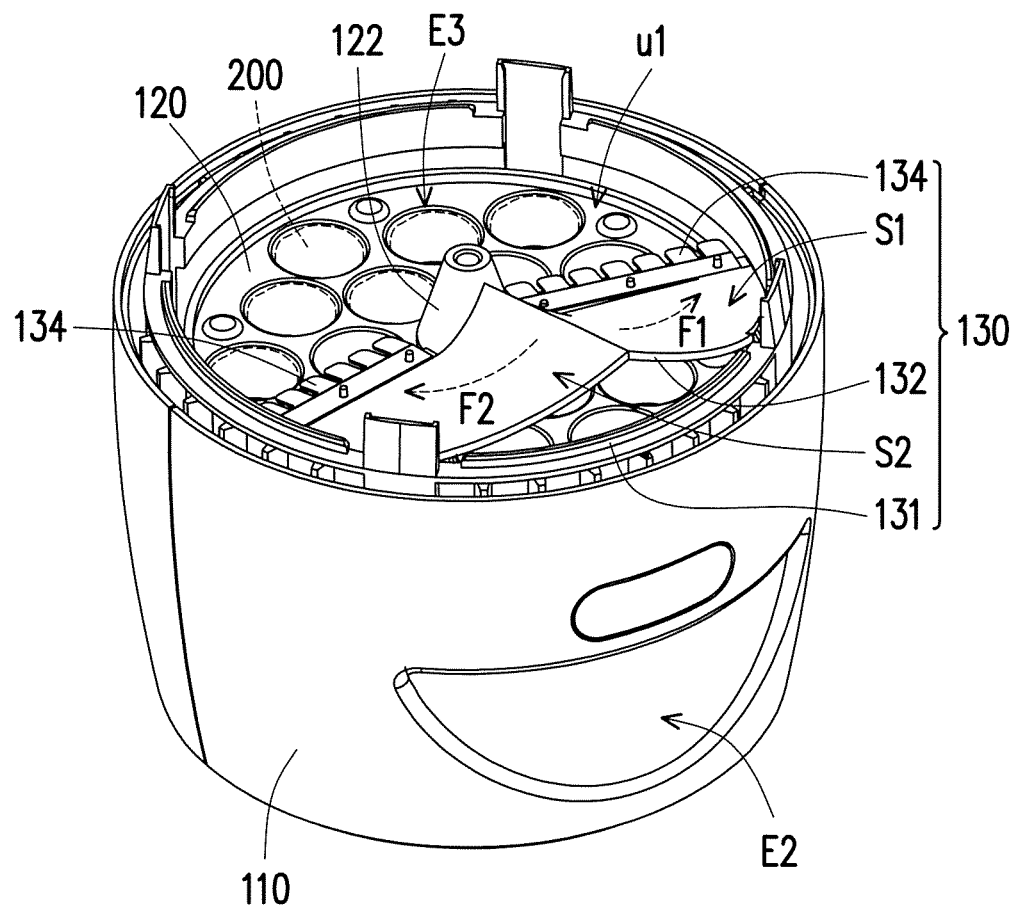
FIG. 4 is a schematic view of a portion of components of the pet feeding device in FIG. 1.
Figure 5:
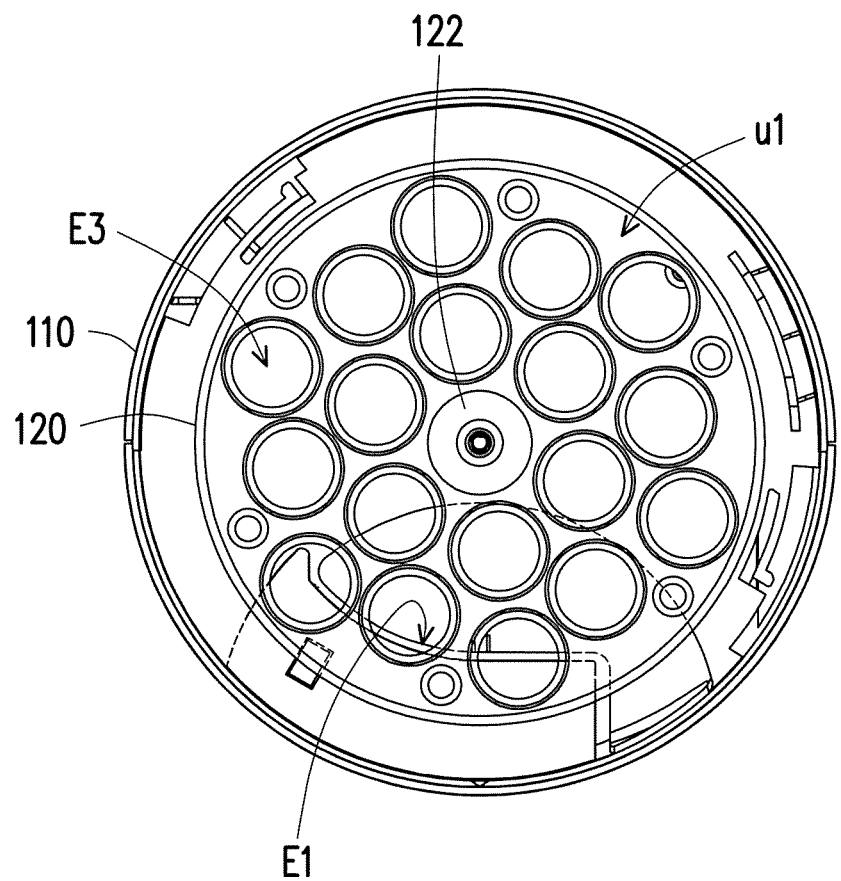
FIG. 5 is a top view of a portion of components of the pet feeding device in FIG. 4.

FIG. 4 is a schematic view of a portion of components of the pet feeding device in FIG. 1. FIG. 5 is a top view of a portion of components of the pet feeding device in FIG. 4. Referring to FIGS. 3 to 5 at the same time, specifically, the pet feeding device 100 further includes a motor 160, and a rotating shaft thereof is connected to a shaft portion 122 of the rotating tray 120 so as to achieve the movement effect of driving the rotating tray 120 to rotate about the axis C1. As shown in FIG. 5, when the rotating tray 120 rotates, the first opening E1 of the base 110 only correspondingly covers a portion of the third opening E3 of the rotating tray 120 substantially. In other words, in the illustration of FIG. 5, only two feed pellets 200 fall from the third opening E3 to the first opening E1, and drop out of the pet feeding device 100 via the second opening E2. That is to say, the rotation mechanism of the rotating tray 120 can be further controlled to achieve that the first opening E1 can correspondingly cover a fixed number of third openings E3 in a unit time so that a fixed number of feed pellets 200 drop out of the pet feeding device 100 via the second opening E2. Nevertheless, the invention provides no limitation to the number of the third openings E3 correspondingly covered by the first opening E1, and the number can be changed appropriately depending on the need. In the meantime, the embodiment provides no limitation to the rotation mechanism that drives the rotating tray 120. A related rotation mechanism can be acquired based on known technology to obtain the required rotation movement.

It should be noted that the diameter of the third opening E3 is the same size as the feed pellets 200 so that each of the third openings E3 receives only one feed pellet 200. With such design, it can be avoided that too many feed pellets 200 drop out of the pet feeding device 100 so as to achieve the purpose of feeding with a fixed number of feed pellets. Nevertheless, the size of the third opening E3 and the feed pellets 200 can be correspondingly changed depending on the need.

Further referring to FIGS. 3 and 4, in the embodiment, the stirring assembly 130 is assembled on the base 110 and has rolling surfaces S1, S2 and a stirring sheet 134. More specifically, the stirring assembly 130 includes an annular structure 131 and a plate 132, wherein the annular structure 131 is assembled on the base 110 in a fixed manner to surround the rotating tray 120. The plate 132 is disposed in the annular structure 131 and on the rotating tray 120 to cover a portion of the third opening E3. In the meantime, the plate 132 has the rolling surfaces S1 and S2. When the rotating tray 120 rotates, the third opening E3 is either hidden under the plate 132 or exposed to the plate 132 to cause relative movement between the plate 132 and rotating tray 120.

As shown in the drawing, the rolling surfaces S1 and S2 are respectively two inclined surfaces relative to the rotating tray 120, and the connection portion of the rolling surfaces S1 and S2 is located in a higher position relative to the rotating tray 120 and forms a ridge accordingly. When the feed pellets 200 are put into the pet feeding device 100 via the fourth opening E4, some of the feed pellets 200 fall onto the rolling surfaces S1 and S2. Since they are respective inclined surfaces, the feed pellets 200 thereon roll along paths F1 and F2 due to gravity toward an upper edge u1 of the rotating tray 120 so that the feed pellets 200 can fall into the third opening E3 easily. Here, the inclined surface refers to a surface that is inclined relative to a planar surface on which the rotating tray 120 is disposed, and the axis C1 is orthogonal to the planar surface.

Furthermore, the stirring sheets 134 are disposed at a lower position of the rolling surfaces S1 and S2 respectively and is in contact with the upper edge u1 of the rotating tray 120. Meanwhile, the stirring sheet 134 is inclined relative to the upper edge u1 of the rotating tray 120. Therefore, as described above, under the circumstances that each third opening E3 can only receive one feed pellet 200, the rest of feed pellets 200 that do not fall into the third opening E3 are accumulated on the upper edge u1 of the rotating tray 120. At this time, when the rotating tray 120 rotates, the stirring sheet 134 can shovel and push aside the rest of feed pellets 200 that do not fall into the third opening E3 away from the third opening E3 that already has the feed pellet 200 to keep the feed pellets 200 rolling on the upper edge u1 of rotating tray 120 to wait for the empty third opening E3. In the meantime, some of the feed pellets 200 are also shoveled toward the plate 132 and moved to the rolling surface S1 or/and S2. As mentioned above, the feed pellets 200 thereon also roll toward the upper edge u1 of the rotating tray 120 due to the inclined rolling surfaces S1 and S2. It should also be indicated that the material of the stirring sheet 134 is polypropylene (PP) and therefore has better elasticity and toughness. Therefore, the stirring sheet 134 does not easily break the feed pellets 200 when stirring the feed pellets 200, and also has better adherence to the upper edge of the rotating tray 120; moreover, the stirring sheet 134 is not easily broken due to the bending caused by structural interference.

Accordingly, apart from falling into the third opening E3 of the rotating tray 120, the feed pellets 200 in the pet feeding device 100 can be in a rolling status due to the relative movement between the rotating tray 120 and the plate 132 of the stirring assembly 130. Also, since the rolling surfaces S1 and S2 of the plate 132 are inclined surfaces, it can be avoided that the feed pellets 200 are accumulated in the same position of the plate 132. With cooperation of the stirring assembly 130 and rotating tray 120, the embodiment can effectively increase the chance that the feed pellets 200 fall into the third opening E3 while avoiding the situation that the feed pellets 200 are ground or stocked between the rotating tray 120 and plate 132 caused by rotation of the rotating tray 120.

Figure 6:
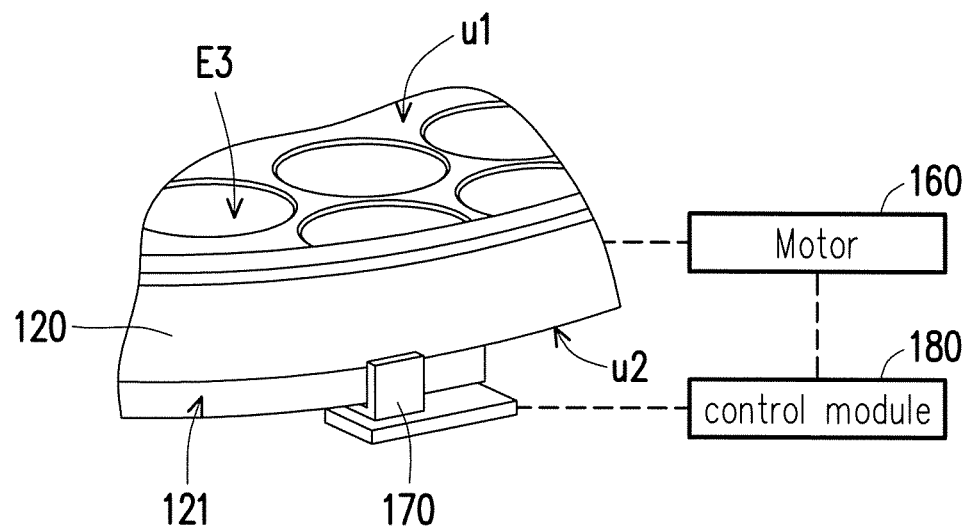
FIG. 6 is a schematic view of a portion of components of the pet feeding device in FIG. 1.

FIG. 6 is a schematic view of a portion of components of the pet feeding device in FIG. 1. Referring to FIG. 3 and FIG. 6 at the same time, in the embodiment, the pet feeding device 100 further includes a photo-sensitive switch 170 and a control module 180, wherein the photo-sensitive switch 170 and the motor 160 are respectively electrically connected to the control module 180, and the control module 180 can control the rotation speed of the rotating tray 120 driven by the motor 160. Here, the photo-sensitive switch 170 can be acquired based on known technology; therefore, no repetition is incorporated herein. Furthermore, a lower edge u2 of the rotating tray 120 further has at least one stopper 121, and the photo-sensitive switch 170 is disposed on base 110 and located in the moving path of the stopper 121. As such, with configuration of the stopper 121 that passes through the photo-sensitive switch 170 and blocks the sensing of light, the control module 180 can therefore control the motor 160 to achieve the effect of turning on the motor 160 or stopping the motor 160 so as to control the movement mode of the rotating tray 120.

For example, if six stoppers 121 are equally disposed along the circumference of the lower edge u2 of the rotating tray 120, it means that an angle of circumference between any two adjacent stoppers 121 is 60 degrees. As such, the control module 180 can control the rotating tray 120 to stop every time when it rotates 60 degrees based on the corresponding relationship between the stopper 121 and the photo-sensitive switch 170. Therefore, it can be controlled that a fixed number of third openings E3 pass through the first opening E1 in a unit time (during the process that the rotating tray 120 rotates 60 degrees) so that the feed pellets 200 fall in a fixed number. In addition, the control module 180 can be controlled by the owner via wireless communication so as for the owner to control the number of feed pellets to be fed when away from the pet.

Figure 7:
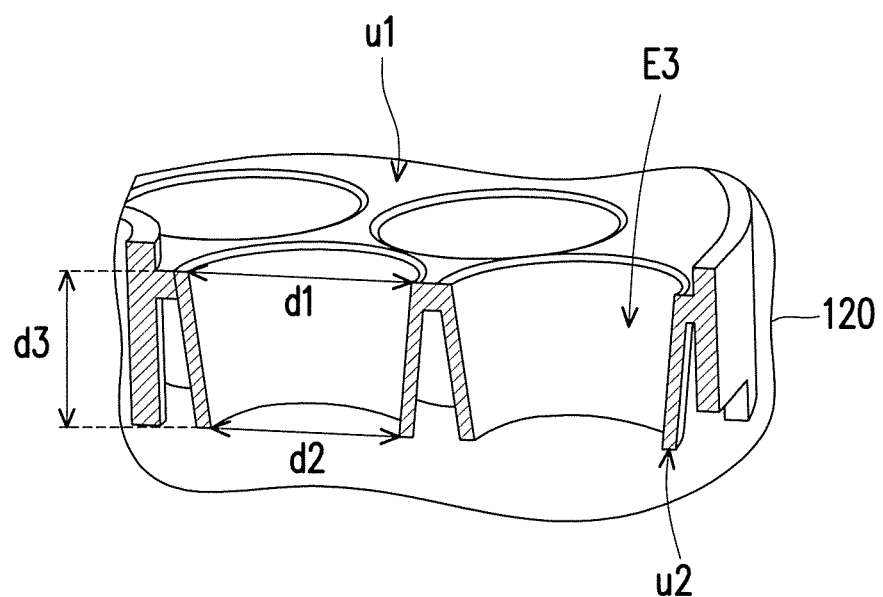
FIG. 7 is a sectional view of a portion of components of the pet feeding device in FIG. 1.

FIG. 7 is a sectional view of a portion of components of the pet feeding device in FIG. 1. Referring to FIG. 7, it should be indicated that a section of each third opening E3 is in a taper shape that converges in a direction from the upper edge u1 toward the lower edge u2. The diameter in the lower edge u2 is the same size as the feed pellets 200, which facilitates to maintain the status that each third opening E3 can only receive one feed pellets 200. Meanwhile, since the diameter of the third opening E3 in the upper edge u1 is larger than the size of the feed pellets 200, which helps the stirring sheet 134 to stir the feed pellets 200 that do not completely fall into the third opening E3 away from the third opening E3 to keep rolling on the upper edge u1. In the embodiment, the third opening E3 has a first diameter d1 (i.e. maximum diameter), second diameter d2 (i.e. minimum diameter) and a sectional depth d3. The size of the first diameter d1 needs to be smaller than 200% of the minimum outer diameter of each feed pellet 200; the size of the second diameter d2 needs to be larger than or equal to 127% of the minimum outer diameter of each feed pellet 200; the sectional depth d3 of third opening E3 is equal to a mean value of the maximum outer diameter and minimum outer diameter of each feed pellet 200 to ensure that each third opening E3 can only receive one feed pellet 200 at the same time and allow the feed pellet 200 to pass through. In the meantime, by using the taper shape with an inclining effect, the feed pellets 200 are not jammed but fall smoothly along both sides and fall into the third opening E3 with the rotation of rotating tray 120.

Figure 8:
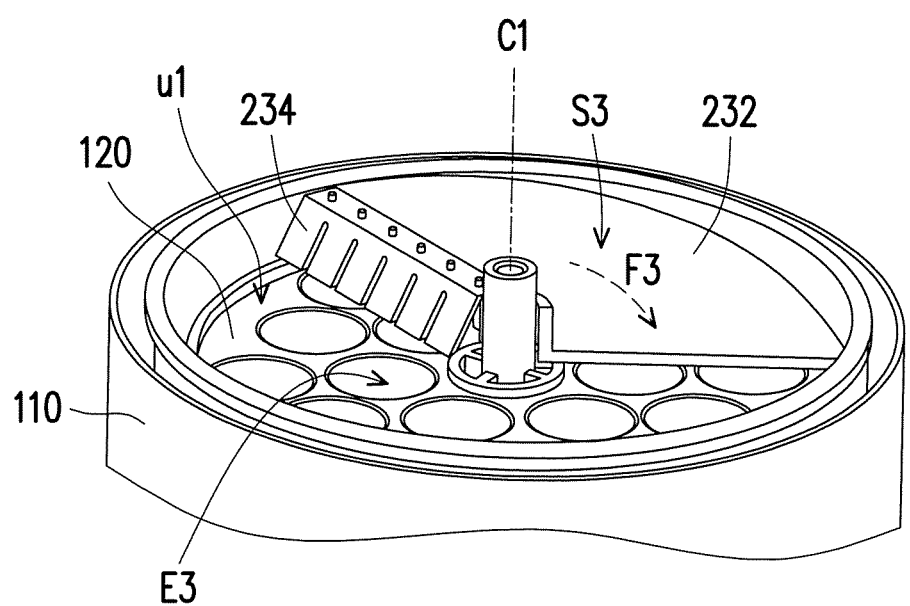
FIG. 8 is a partial view of a pet feeding device according to another embodiment of the invention.

FIG. 8 is a partial view of a pet feeding device according to another embodiment of the invention. Referring to FIG. 8, different from the previous embodiments, a plate 232 of the stirring assembly has only one rolling surface S3. The rolling surface S3 is also inclined relative to the rotating tray 120. Therefore, the rolling surface S3 in the embodiment has two side edges in a high and low manner, and a stirring sheet 234 is disposed on the higher side edge. Here, the rolling surface S3 can make the feed pellets (not shown, please refer to the previous embodiment) thereon to move toward the upper edge u1 of the rotating tray 120 along a path F3 with the contour of its inclined surface. Therefore, it can be avoided that the feed pellets 200 are accumulated in the same position of the plate 232 but no feed pellet falling into the third opening E3 while the rotating tray 120 keeps rotating.

Based on the above, in the embodiments of the invention, the pet feeding device receives a plurality of feed pellets via a plurality of third openings of the rotating tray, and each third opening can only receive one feed pellet. When the rotating tray rotates, the first opening in the base covers portion of the third openings correspondingly in a unit time, and the feed pellets in the corresponding third openings drop out of the pet feeding device for the pet via the first opening and the second opening. By controlling the corresponding relationship between the third opening of the rotating tray and first opening in the base, the number of feed pellets dropped out in a unit time can be fixed so that the amount of food to be fed to the pet can be controlled effectively.

Specifically, the method for controlling the fixed amount of food includes providing a photo-sensitive switch, and a plurality of stoppers are correspondingly arranged with a fixed interval on the rotation tray so the rotating tray can be stopped every time after rotating to a particular angle. Accordingly, it can be controlled that the rotating tray passes through the first opening with a fixed number of third openings to ensure a fixed number of feed pellets to fall.

Moreover, the pet feeding device further includes a stirring assembly, which is disposed on the rotating tray and includes at least one inclined surface and a stirring sheet. The stirring sheet is configured to stir the feed pellets into the third opening of the rotating tray or stir away the feed pellets that do not fall into the third opening completely so the feed pellets that are stirred away can stay rolling on the upper edge of the rotating tray to wait for the empty third opening. Said at least one inclined surface is configured to make the feed pellets thereon not to be accumulated in the same position but move toward the upper edge of the rotating tray along at least one path. Accordingly, with the cooperation of the rotating tray and stirring assembly, the chance that the feed pellets fall into the third opening can be increased; also, it can be avoided that the feed pellets are ground or stocked.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A pet feeding device, receiving and housing a plurality of feed pellets for a pet, comprising:
   a base, comprising:
      a first opening; and
      a second opening, wherein the first opening and the second opening arc communicated with each other, and the second opening connects the base and an exterior environment;
   a rotatable tray, wherein the rotatable tray is disposed on the base and rotating about an axis, and the rotatable tray comprising:
      a plurality of third openings, wherein a section of each of the third openings is in a taper shape, and the taper shape converges in a direction away from an upper edge of the rotatable tray, the plurality of feed pellets received in the pet feeding device falling into the third openings respectively with a rotation of the rotatable tray, in a process of the rotation, the first opening overlapping a portion of the third openings correspondingly in a unit time, and the feed pellets in the corresponding third openings dropping out of the pet feeding device via the first opening and the second opening; and
   a stirring assembly, assembled on the base, the stirring assembly comprising:
      at least a rolling surface; and
      at least a stirring sheet, wherein the at least one of the at least a rolling surface and the at least one of the at least a stirring sheet are disposed above the rotatable tray, the plurality of feed pellets falling on the at least one of the at least a rolling surface move toward the upper edge of the rotatable tray, an edge of the at least one of the at least a stirring sheet is in contact with the upper edge of the rotatable tray so as to stir the plurality of feed pellets into the third openings or stir the plurality of feed pellets not completely falling into the third openings away from the third openings already having the plurality of feed pellets.

2. The pet feeding device according to claim 1, wherein the at least one of the at least a rolling surface is an inclined surface relative to the rotatable tray, the plurality of feed pellets disposed on the inclined surface are driven by gravity to move toward the upper edge of the rotatable tray.

3. The pet feeding device according to claim 1, wherein the at least a stirring assembly is two rolling surfaces, the two rolling surfaces are respectively two inclined surfaces relative to the rotatable tray, the plurality of feed pellets disposed on the two inclined surfaces are driven by gravity to move toward the upper edge of the rotatable tray along different paths.

4. The pet feeding device according to claim 1, wherein the stirring assembly further comprises:
   an annular structure; and
   a plate, wherein the annular structure is assembled on the base and surrounds the rotatable tray, and the plate is disposed within the annular structure and comprises the at least a rolling surface.

5. The pet feeding device according to claim 1, wherein the at least one of the at least a stirring sheet is inclined relative to the rotatable tray.

6. The pet feeding device according to claim 1, wherein the material of the at least one of the at least a stirring sheet is polypropylene (pp).

7. The pet feeding device according to claim 1, wherein a lower edge of the rotatable tray comprises at least a stopper, and the pet feeding device further comprises:
   a motor, wherein the motor is disposed on the base while being connected to and driving the rotatable tray;
   a photo-sensitive switch, wherein the photo-sensitive switch is disposed on the base and disposed on a moving path of the stopper; and
   a control module, wherein the control module is electrically connected to the photo-sensitive switch and the motor, wherein the control module turns on or stops the motor when the stopper passes through the photo-sensitive switch so as to control a rotating angle of the rotatable tray.

* * * * *